United States Patent Office 3,840,486
Patented Oct. 8, 1974

3,840,486
WATER-SOLUBLE, THERMOSETTABLE RESINOUS COMPOSITIONS PREPARED FROM DICYANDIAMIDE, HCHO, AMMONIUM SALT AND A SALT OF AN AMINOPOLYAMIDE AND METHOD FOR PREPARING THE SAME
David H. Dumas, Hockessin, Del., assignor to Hercules Incorporated, Wilmington, Del.
No Drawing. Filed July 3, 1972, Ser. No. 268,274
Int. Cl. C08g 9/12
U.S. Cl. 260—29.4 R
14 Claims

ABSTRACT OF THE DISCLOSURE

Disclosed are novel water-soluble, thermosettable resinous compositions derived by reaction of dicyandiamide, an ammonium salt, formaldehyde, and an acid salt of a water-soluble aminopolyamide such, for example, as the water-soluble aminopolyamide derived by reaction of adipic acid and diethylenetriamine. The resinous compositions of this invention are water-soluble and are cationic. They have particular utility in the manufacture of paper sized with cellulose reactive sizing agents such as ketene dimer sizing agents.

---

This invention relates to novel water-soluble, thermosettable resinous compositions derived by reaction of dicyandiamide, an ammonium salt, formaldehyde, and an acid salt of an aminopolyamide. The resinous compositions are cationic and water-soluble. They have particular utility in the manufacture of sized paper wherein the sizing agent employed is a cellulose reactive sizing agent such as a ketene dimer sizing agent.

The novel cationic water-soluble thermosettable resinous compositions of this invention accelerate the sizing imparted to paper by cellulose reactive sizing agents as ketene dimers, acid anhydrides, and isocyanates. Thus, by employing the novel resinous compositions of this invention in combination with certain known sizing agents for paper, higher off-the-machine sizing is provided than when using equivalent amounts of the sizing agent alone.

As above set forth, dicyandiamide is one of the reactants employed in preparing the novel resinous compositions of this invention. Dicyandiamide is also known as cyanoguanidine. Dicyandiamide has the following structure:

Formaldehyde is another reactant employed to prepare the resinous compositions of this invention. As employed in this specification and in the claims, formaldehyde includes formaldehyde in the form of 30–40% aqueous solutions; polymeric forms of formaldehyde such, for example, as paraformaldehyde, trioxane, and hexamethylenetetramine. Chemical compounds such as acetals which will liberate formaldehyde on heating can be employed as a source of formaldehyde if desired.

The ammonium salt reactant is a water-soluble salt of an amine and an acid. Particularly suitable salts are those having the formula $(NH_4)_nX$; $(RNH_3)_nX$; or $$(RR'NH_2)_nX$$

where R is an alkyl radical having from 1 through 4 carbon atoms such as methyl, ethyl, propyl, isopropyl, and n-butyl and R' is an alkyl radical having from 1 through 4 carbon atoms such as methyl, ethyl, propyl, isopropyl and n-butyl. X is the acid anion such, for example, as $Cl^-$, $Br^-$, $I^-$, $SO_4^=$, $CH_3COO^-$, $NO_3^-$, and $PO_4^\equiv$ and n is an integer equal to the anion charge. Thus, for example, when X is $SO_4^=$, n is 2; when X is $Cl^-$, n is 1; and when X is $PO_4^\equiv$, n is 3. Specific examples of suitable ammonium salts include ammonium sulfate, ammonium chloride, methyl ammonium chloride, dimethyl ammonium chloride, ethyl ammonium sulfate, and ammonium acetate.

Other suitable ammonium salts are the water-soluble salts of (1) a polyamide having the structure

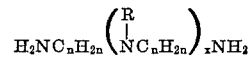

where R is hydrogen or methyl; n is an integer 2 through 6, and x is an integer 0 through 3 and (2) an acid such as sulfuric acid hydrochloric acid, hydrobromic acid, hydroiodic acid, nitric acid, phosphoric acid and acetic acid. Specific examples of polyamines are ethylene diamine, propylene diamine, hexamethylene diamine, diethylenetriamine, triethylenetetramine, tetraethylenepentamine, and bis(3-aminopropyl)amine.

Another reactant is an acid salt of an aminopolyamide. The aminopolyamide is derived by reaction of a dicarboxylic acid and a polyalkylenepolyamine in a mole ratio of polyalkylenepolyamine to dicarboxylic acid of from about 0.8:1 to about 1.4:1.

Particularly suitable dicarboxylic acids are diglycolic acid and saturated aliphatic dicarboxylic acids containing from 3 through 10 carbon atoms such as malonic acid, succinic acid, glutaric acid, adipic acid, pimelic acid, suberic acid, azelaic acid and sebacic acid.

Other suitable dicarboxylic acids include terephthalic acid, isophthalic acid, phthalic acid and alpha-unsaturated dicarboxylic acids such as maleic acid, fumaric acid, itaconic acid, glutaconic acid, citraconic acid and mesaconic acid.

The available anhydrides of the above acids can be used for preparing the water-soluble aminopolyamide as well as the esters of the acids. Mixtures of two or more of the above acid moieties can be employed if desired.

A number of polyalkylenepolyamines, including polyethylenepolyamines, polypropylenepolyamines, polybutylenepolyamines and the like can be employed herein. The polyalkylenepolyamine employed will have two primary amine groups. Polyalkylenepolyamines can be represented as polyamines in which the nitrogen atoms are linked together by groups of the formula $-C_nH_{2n}-$ where n is a small integer greater than unity, preferably n is 2 through 6, and the number of such groups in the molecule ranges from two up to about eight. The nitrogen atoms can be attached to adjacent carbon atoms in the group $-C_nH_{2n}-$ or to carbon atoms farther apart, but not to the same carbon atoms. Polyamines such as diethylenetriamine, triethylenetetramine, tetraethylenepentamine, and bis(3-aminopropyl)amine, which can be obtained in reasonably pure form are suitable for preparing water-soluble aminopolyamides. Other polyalkylenepolyamines that can be used include methyl-bis(3-aminopropyl)amine; methyl bis(2-aminoethyl)amine; and 4,7-dimethyltriethylenetetramine. Mixtures of polyalkylenepolyamines can be used, if desired.

The above polyalkylenepolyamines can be represented by the formula

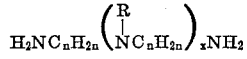

where R is hydrogen or methyl; n is an integer 2 through 6, as above set forth, and x is an integer 1 through 3.

Other polyalkylenepolyamines that can be employed and which are not included in the above formula include 1,4-bis(3-aminopropyl)piperazine and 1 - (2 - aminoethyl) piperazine.

The spacing of an amino group on the aminopolyamide can be increased if desired. This can be accomplished by substituting a diamine such as ethylenediamine, propylenediamine, hexamethylenediamine and the like for a portion of the polyalkylenepolyamine. For this purpose, up to about 80% of the polyalkylenepolyamine can be replaced by a molecularly equivalent amount of diamine. Usually, a replacement of about 50% or less will be adequate.

Temperatures employed for carrying out reaction between the dicarboxylic acid and the polyalkylenepolyamine can vary from about 110° C. to about 250° C. or higher at atmospheric pressure. For most purposes, temperatures between about 160° C. and 210 C. are preferred. The time of reaction will usually vary from about ½ to 2 hours. The reaction is desirably continued to substantially completion. Reaction time varies inversely with reaction temperatures employed.

In carrying out the reaction, it is preferred to use an amount of dicarboxylic acid sufficient to react substantially completely with the primary amine groups of the polyalkylenepolyamine but insufficient to react with the secondary amine groups and/or tertiary amine groups to any substantial extent. This will usually require a mole ratio of polyalkylenepolyamine to dicarboxylic acid of from about 0.9:1 to about 1.2:1. However, mole ratios of from about 0.8:1 to about 1.4:1 can be used.

The following examples are illustrative of the preparation of suitable aminopolyamides for use as its salt in this invention. All parts and percentages are by weight unless otherwise indicated.

EXAMPLE 1

Diethylenetriamine, 100 parts, is placed in a reaction vessel equipped with motor-driven stirrer, thermometer and condenser. To this is added 146 parts adipic acid. After the acid has dissolved in the diethylenetriamine, the resulting solution is heated and maintained at a temperature of from about 170° C. to 175° C. for a period of time sufficient to provide a reaction mass having a viscosity of about 0.14. The reaction mass is diluted with water to a solids content of about 50%.

EXAMPLE 2

To a resin kettle equipped with anchor stirrer, nitrogen sparge tube, thermometer, and distilling head are charged 61.9 parts (0.60 mole) diethylenetriamine, 16.2 parts (0.27 mole) ethylenediamine, 19.77 parts (0.267 mole) 1,3-diaminopropane, and 175.2 parts (1.20 moles) adipic acid. The mixture is heated to 175° C. and maintained at 175° C. for about 4 hours while 39.7 parts distillate is collected. A viscous reaction mass is produced which is diluted with about 200 parts of 80° C. water to give a 52.2% solids solution. The aminopolyamide has a reduced specific viscosity (RSV)=0.142 (=$\eta_{sp.}/c$. in aqueous 1 $M$ NH$_4$Cl at 25° C., where C.=2 g. solids/100 ml. solution).

EXAMPLE 3

A stirred mixture of 151.4 parts (0.80 mole) tetraethylene pentamine, 35.0 parts water, and 134.8 parts (0.667 mole) sebacic acid is heated at 170–183° C. for about 1.7 hours with the evolution of about 57 parts of aqueous distillate. The resulting aminopolyamide is decanted and cooled to room temperature. The polymer has an RSV—0.24 (measured as a 2 g./100 ml. solution in 1 $M$ NH$_4$Cl at 25° C.).

EXAMPLE 4

An aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170–180° C. under a nitrogen blanket until amide formation is complete. After air cooling to approximately 140° C., hot water is added with stirring to provide a 50% solids solution of polyamide resin with an intrinsic viscosity of 0.140 measured by using a 2% solution in 1 N NH$_4$Cl.

The preferred procedure for use in preparing the novel resinous compositions of this invention is set forth below.

Into a reaction vessel are placed about one mole of dicyandiamide (cyanoguanidine), from about ¾ mole to about 1½ moles of formaldehyde, aminopolyamide in an amount sufficient to provide from about ⅛ to about ½ of an equivalent of basic nitrogen (as distinguished from the amide nitrogens of the aminopolyamide), and an acid in an amount equivalent to the amount of the basic nitrogen of the aminopolyamide. Suitable acids include sulfuric acid, hydrochloric acid, phosphoric acid, nitric acid, acetic acid, hydrobromic acid and hydroiodic acid. Water is conveniently employed as the reaction medium and sufficient water should be present in the mixture to provide an aqueous reaction mass that can be easily agitated (as by stirring) under reaction conditions. The amount of water employed is well within the skill of one versed in the art having before him the teachings of this invention. The acid forms the aminopolyamide acid salt reactant.

The aqueous mixture is subsequently heated to reflux temperature (about 95° C.–105° C.) and refluxed for a period of time of about 15 minutes to about 30 minutes (or longer, if desired). Subsequently, the ammonium salt is added in an amount such that there will be from about 0.8 equivalent to about 1.2 equivalents (preferably about 1 equivalent) of basic nitrogen present in the reaction mixture. Thus, for example, when the aminopolyamide is employed in an amount equal to ½ (0.5) equivalent of basic nitrogen, the amount of ammonium salt employed will be such as to provide from about 0.3 equivalent to about 0.7 equivalent of basic nitrogen. The resulting mixture is heated to reflux and maintained at reflux temperature until essentially all available nitriles (—C≡N) have reacted. This can be easily and readily determined by infrared analysis. This will usually require a period of time of from about 2 to 4 hours.

Subsequently, there is added to the reaction mass from about 1.25 to about 3.75 moles of formaldehyde. The resulting mixture is then heated to reflux and maintained at reflux until the viscosity of an aqueous solution of the resinous reaction product having a solids content of from about 50% to about 60% is from about G to X on the Gardner-Holdt scale (measured at 25° C.) and preferably from about S to X. This will usually require a period of time of from about 20 minutes to about 3 hours. The aqueous solution is then diluted with water to a solids content of less than about 35% and preferably from about 20% to about 25% and the pH is adjusted to from about 6 to about 7.

If desired, the novel water-soluble thermosettable resinous compositions of this invenition can be derived by providing a mixture of all the above ingredients in the above amounts (employing, as above, water as the reaction medium), heating the mixture to reflux and maintaining at reflux until the viscosity of an aqueous solution of the resinous reaction product having a solids content of from about 50% to about 60% is from about G to X (preferably S to X) on the Gardner-Holdt scale (measured at 25° C.).

The following examples are illustrative of the preparation of the resinous compositions of this invention. All parts and percentages are by weight unless otherwise specified. In the examples Gardner-Holdt viscosity measurements are made at 25° C.

EXAMPLE 5

Into a reaction vessel fitted with reflux condenser, mechanical stirrer and thermometer are placed the following to provide a mixture of ingredients:

| Ingredients: | Parts |
|---|---|
| Polyamide solution of Example 4 (50% solids). | 660 (1.55 equivalents of basic nitrogen. |
| Formaldehyde (37% aqueous solution | 400 (4.91 moles). |
| Dicyandiamide | 336 (4.0 moles). |
| $H_2SO_4$ (98%) | 77.6 (.78 mole). |

Sulfuric acid is added last and is added dropwise. During addition of the sulfuric acid temperature of the mixture increases to about 40–45° C. The mixture is then heated to a temperature of about 100° C. and refluxed for about 15 minutes. There is then added to the reaction vessel 172 parts (1.30 moles) of ammonium sulfate. Reaction is continued at reflux for about 3 hours. Formaldehyde (37% aqueous solution), 800 parts (9.8 moles), is added to the refluxing action mixture and reflux continued for an additional 2½ hours at which time the Gardner-Holdt viscosity of the aqueous solution of the resinous reaction product is V. Water, 1200 parts, is added to the reaction vessel and the contents thereof cooled to room temperature (about 23° C.). The pH of the aqueous solution of the resinous reaction product is adjusted by adding thereto 350 parts of 10% aqueous solution of sodium hydroxide. Total solids is 30% and the Gardner-Holdt viscosity of the aqueous solution is B.

EXAMPLE 6

Into a reaction vessel fitted with reflux condenser, mechanical stirrer, and thermometer are placed the following to provide a mixture of ingredients:

| Ingredients: | Parts |
|---|---|
| Polyamide solution of Example 4 (50% solids). | 660 (1.55 equivalents of basic nitrogen. |
| Formaldehyde (37% aqueous solution | 400 (4.91 moles). |
| Dicyandiamide | 335 (4.0 moles). |
| $H_2SO_4$ (98%) | 77.6 (.78 mole). |

Sulfuric acid is added last and is added dropwise. During addition of the sulfuric acid temperature of the mixture increases to about 40–45° C. The mixture is then heated to a temperature of about 100° C. and refluxed for about 15 minutes. There is then added to the reaction vessel 172 parts (1.30 moles) of amonium sulfate. Reaction is continued at reflux for about 3 hours. Formaldehyde (37% aqueous solution), 400 parts (4.9 moles), is added to the refluxing reaction mixture and reflux continued for an additional 20 minutes at which time the Gardner-Holdt viscosity of the aqueous solution of the resinous reaction product is X. Water, 1600 parts, is added to the reaction vessel and the contents thereof cooled to room temperature. The pH of the aqueous solution of the resinous reaction product is adjusted to 6.5 by adding thereto 284 parts of 10% aqueous solution of sodium hydroxide. Total solids is 27% and the Gardner-Holdt viscosity of the aqueous soltuion is A/B.

EXAMPLE 7

Into a reaction vessel fitted with reflux condenser, mechanical stirrer and thermometer are placed the following to provide a mixture of ingredients:

| Ingredients: | Parts |
|---|---|
| Polyamide solution of Example 4 (50% solids). | 660 (1.55 equivalents of basic nitrogen. |
| Formaldehyde (37% aqueous solution | 400 (4.91 moles). |
| Dicyandiamide | 335 (4.0 moles). |
| $H_2SO_4$ (98%) | 77.6 (.78 mole). |

Sulfuric acid is added last and is added dropwise. During addition of the sulfuric acid temperature of the mixture increases to about 40–45° C. The mixture is then heated to a temperature of about 100° C. and refluxed for about 15 minutes. There is then added to the reaction vessel 172 parts (1.30 moles) of amonium sulfate. Reaction is continued at reflux for about 3 hours. Formaldehyde (37% aqueous solution), 1200 parts (14.7 moles) is added to the refluxing reaction mixture and reflux continued for an additional 2½ hours at which time the Gardner-Holdt viscosity of the aqueous solution of the resinous reaction product is G. Water, 800 parts, is added to the reaction vessel and the contents thereof cooled to room temperature. The pH of the aqueous solution of the resinous reaction product is adjusted to 6.5 by adding thereto 420 parts of 10% aqueous solution of sodium hydroxide. Total solids is 31% and the Gardner-Holdt viscosity of the aqueous solution is A/B.

EXAMPLE 8

Into a reaction vessel fitted with reflux condenser, mechanical stirrer, and thermometer are placed the following to provide a mixture of ingredients:

| Ingredients: | Parts |
|---|---|
| Polyamide solution of Example 4 (50% solids). | 660 (1.55 equivalents of basic nitrogen. |
| Formaldehyde (37% aqueous solution | 400 (4.91 moles). |
| Dicyandiamide | 335 (4.0 moles). |
| HCl (37%) | 171 (1.7 moles). |

The mixture is heated to a temperature of about 94° C. and refluxed for about 15 minutes. There is then added to the reaction vessel 150 parts (2.6 moles) of ammonium chloride. Reaction is continued at reflux for about 3 hours. Formaldehyde (37% aqueous solution), 800 parts (9.8 moles) is added to the refluxing reaction mixture and reflux continued for an additional 2 hours at which time the Gardner-Holdt viscosity of the aqueous solution of the resinous reaction product is V/W. Water, 640 parts, is added to the reaction vessel and the contents thereof cooled to room temperature. The pH of the aqueous solution of the resinous reaction product is adjusted to 6 by adding thereto 800 parts of 5% aqueous solution of sodium hydroxide. Total solids is 30% and the Gardner-Holdt viscosity of the aqueous solution is A/B.

EXAMPLE 9

Into a reaction vessel fitted with reflux condenser, mechanical stirrer and thermometer are placed the following to provide a mixture of ingredients:

| Ingredient: | Parts |
|---|---|
| Polyamide solution of Example 4 (50% solids) | 330 (0.78 equivalent of basic nitrogen). |
| Formaldehyde (37% aqueous solution) | 400 (4.91 moles). |
| Dicyandiamide | 336 (4.0 moles). |
| HCl (37%) | 72 (0.72 mole). |

The mixture is heated to a temperature of about 100° C. and refluxed for about 15 minutes. There is then added to the reaction vessel 150 parts (2.6 moles) of ammonium chloride. Reaction is continued at reflux for about 3 hours. Formaldehyde (37% aqueous solution, 800 parts (9.8 moles), is added to the refluxing reaction mixture and reflux continued for an additional 2 hours. Water, 1050 parts, is added to the reaction vessel and the contents thereof cooled to room temperature. The pH of the solution is then adjusted to about 6.3 with 50% aqueous NaOH. Total solids of the aqueous solution is 31.5%.

The resinous reaction products of this invention are thermosettable and water-soluble. They have particular utility as sizing accelerators for hydrophobic cellulose reactive sizing agents such as ketene dimers, acid anhydrides, and isocyanates.

Hydrophobic acid anhydrides useful as cellulose reactive sizing agents for paper include (A) rosin anhydride (see Pat. 3,582,464; (E) anhydrides having the structure (I) 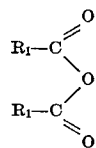

where $R_1$ is a saturated or unsaturated hydrocarbon radical, the hydrocarbon radical being a straight or branched chain alkyl radical, an aromatic substituted alkyl radical, an aromatic radical, or an alkyl substituted aromatic radical so long as the hydrocarbon radical contains a total of from about 16 to 36 carbon atoms; and (C) cyclic dicarboxylic acid anhydrides having the structure:

(II) 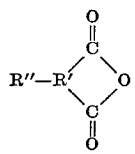

where R' represents a dimethylene or trimethylene radical and where R" is a hydrocarbon radical containing more than 7 carbon atoms which are selected from the group consisting of alkyl, alkenyl, aralkyl or aralkenyl. Substituted cyclic dicarboxylic acid anhydrides falling within the above formula (II) are substituted succinic and glutaric anhydrides. In formula (I) above each $R_1$ can be the same hydrocarbon radical or each $R_1$ can be a different hydrocarbon radical.

Specific examples or anhydrides of formula (I) are myristoyl anhydride, palmitoyl anhydride, oleoyl anhydride, and stearoyl anhydride.

Specific examples of anhydrides of formula (II) are iso-octadecenyl succinic acid anhydride; n-hexadecenyl succinic acid anhydride, dodecyl succinic acid anhydride, decenyl succinic acid anhydride, octenyl succinic acid anhydride, and heptyl glutaric acid anhydride.

Isocyanates that can be used as cellulose reactive sizing agents include rosin isocyanate and isocyanates having the formula $R_1NCO$ where $R_1$ is as above defined. Specific examples of such isocyanates are octadecyl isocyanate, dodecyl isocyanate, tetradecyl isocyanate, hexyldecyl isocyanate, eicosyl isocyanate and docosyl isocyanate.

Ketene dimers used as cellulose reactive sizing agents are dimers having the formula:

$$[R_2CH=C=O]_2$$

where $R_2$ is a hydrocarbon radical, such as alkyl having at least 8 carbon atoms, cycloalkyl having at least 6 carbon atoms, aryl, aralkyl and alkaryl. In naming ketene dimers, the radical "$R_2$" is named followed by "ketene dimer." Thus, phenyl ketene dimer is:

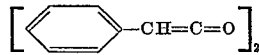

benzyl ketene dimer:

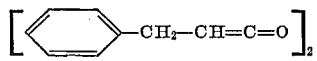

and decyl ketene dimer is: $[C_{10}H_{21}-CH=C=O]_2$. Examples of ketene dimers include octyl, decyl, dodecyl tetradecyl, hexadecyl, octadecyl, eicosyl, docosyl, tetracosyl, phenyl, benzyl beta-naphthyl and cyclohexyl ketene dimers, as well as the ketene dimers prepared from montamic acid, naphthenic acid, $\Delta^{9,10}$–decylenic acid, $\Delta^{9,10}$–dodecylenic acid, palmitoleic acid, oleic acid, ricinoleic acid, linoleic acid, linolenic acd, and eleostearic acid, as well as ketene dimers prepared from naturally occuring mixtures of fatty acids, such as those mixtures in coconut oil, babassu oil, palm kernel oil, palm oil, olive oil, peanut oil, rape oil, beef tallow, lard (leaf) and whale blubber. Mixtures of any of the above-named fatty acids with each other may also be used.

The following examples illustrate the use of the novel resinous compositions of this invention with known paper sizing agents. All parts and percentages are by weight unless otherwise indicated.

EXAMPLE 10

An emulsion of the ketene dimer of oleic acid is pre-prepared by admixing 880 parts of water, 60 parts of cationic corn starch (Ceron X) and 10 parts of sodium lignin sulfonate. The mixture is adjusted to pH of about 3.5 with 98% sulfuric acid. The resulting mixture is heated at 90°–95° C. for about one hour. Water is then added to the mixture in an amount sufficient to provide a mixture of 1750 parts (total weight). About 240 parts of the ketone dimer of oleic acid is stirred into the mixture together with 2.4 parts of thiadiazine. The thiadiazine is used as a preservative. The resulting premix (at 65° C.) is homogenized in one pass through an homogenizer at 4000 p.s.i. The homogenized product is diluted with water to a ketene dimer solids content of about 6%.

As is well known in the art, hydrophobic cellulose reactive sizing agents are used in the internal sizing of paper and in the external sizing of paper. The resinous compositions of this invention can be used in combination with the sizing agent in either method.

EXAMPLE 11

A portion of the 6% ketene dimer emulsion of Example 10 is diluted with water to a ketene dimer content of about 0.125%. The resulting dilute emulsion is used in some of the examples that follow for comparative purposes.

EXAMPLE 12

An emulsion containing 0.125% ketene dimer and 0.125% of the resinous reaction product of Example 5 is prepared from the aqueous emulsion of Example 10 and the aqueous solution of Example 5. This emulsion is used in some of the examples that follow.

EXAMPLE 13

The emulsion of Example 11 is applied to 40 lb./3000 ft.² bleached kraft waterleaf paper in a size press in an amount sufficient to provide therein .087% ketene dimer based on the weight of the paper and the thus treated paper dried at 200° F. on a drum drier for 35 seconds.

EXAMPLE 14

The emulsion of Example 12 is applied to 40 lb./3000 ft.² bleached kraft waterleaf paper in a size press in an amount sufficient to provide thereon .087 ketene dimer and .087% resinous reaction product of Example 5. The thus treated paper is dried at 200° F. on a drum drier for 35 seconds.

Table I below sets forth size test results of the paper sized in accordance with Examples 13 and 14. All size properties given herein are determined by use of the Hercules Sizing Tester using Test Solution No. 2 to 80% reflectance.

TABLE I

| Example | Size test results in seconds average of 3 (average of 3 samples) | |
|---|---|---|
| | Test results obtained within 5 minutes after drying | Test results after aging for 4 days at room temperature |
| 13 | 0 | 370 |
| 14 | 219 | 230 |

EXAMPLES 13A and 14A

Example 13 repeated (Example 13A) and Example 14 is repeated (Example 14A). Size test results are shown in Table II below.

TABLE II

| Example | Size test results in seconds average of 3 (average of 3 samples) | |
|---|---|---|
| | Test results obtained within 5 minutes after drying | Test results after aging for 4 days at room temperature |
| 13A | 0 | 215 |
| 14A | 407 | 308 |

EXAMPLE 15

The procedure of Example 13 is followed using an aqueous paper sizing emulsion of isooctyldecenyl succinic acid anhydride. The amount of anhydride in the emulsion is about 0.15% and the pH thereof is about 7. The amount of size emulsion employed is sufficient to provide on the paper .105% of anhydride based on the weight of the paper.

EXAMPLE 16

The procedure of Example 14 is followed using an aqueous emulsion containing 0.15% of isooctyldecenyl succinic acid anhydride and 0.15% of the resinous reaction product of Example 5. The amount of size emulsion employed is sufficient to provide on the paper .105% of anhydride and .105% of resinous reaction product based on the weight of the paper.

Size test results are shown in Table III below.

TABLE III

| Example: | Size Test Result in Seconds— Obtained Within 5 Minutes After Drying |
|---|---|
| 15 | 306 |
| 16 | 551 |

EXAMPLES 15A and 16A

Example 15 is repeated (Example 15A) and Example 16 is repeated (Example 16A). Size test results are shown in Table IV below. The size emulsion is 24 hours sold.

TABLE IV

| Example: | Size Test Result in Seconds— Obtained Within 5 Minutes After Drying |
|---|---|
| 15A | 0 |
| 15A | 15 |

EXAMPLE 17

The procedure of Example 13 is followed using an aqueous paper size emulsion containing 0.15% of octadecyl isocyanate. The amount of size emulsion employed is sufficient to provide on the paper .105% of isocyanate based on the weight of the paper.

EXAMPLE 18

The procedure of Example 14 is followed using an aqueous size emulsion containing 0.15% of octadecyl isocyanate and 0.15% of the resinous reaction product of Example 5. The amount of size emulsion employed is sufficient to provide on the paper .105% of isocyanate and .105% of resinous reaction product based on the weight of the paper.

Size test results are shown in Table V below.

TABLE V

| Example: | Size Test Result in Seconds— Obtained Within 5 Minutes After Drying |
|---|---|
| 17 | 89 |
| 18 | 216 |

EXAMPLES 17A and 18A

Example 17 is repeated (Example 17A) and Example 18 is repeated (Example 18A). Size test results are shown in Table VI below. The size emulsion is 24 hours old.

TABLE VI

| Example: | Size Test Result in Seconds— Obtained Within 5 Minutes After Drying |
|---|---|
| 17A | 218 |
| 18A | 207 |

It has been determined that the resinous compositions of this invention impart no sizing to paper when employed in amounts normally employed in the paper sizing art.

When employed in combination with hydrophobic cellulose reactive sizing agents in the sizing of paper, the resinous compositions of this invention can be added either separately to the paper pulp (for internal sizing) or separately to the paper sheet (for external sizing), either before or after addition of sizing agent. Alternatively, the resinous composition and sizing agent can be added at the same time to the paper pulp or paper sheet as separate aqueous emulsions or as a single emulsion comprised of the two ingredients. The range of proportions of the sizing agent and the resinuous composition can vary from 1:3 to 3:1.

The amount of resinous composition incorporated into the paper sheet will be from about .05% to about .5% (preferably from about .05% to about .25%) by weight based on the dry weight of the paper.

What I claim and desire to protect by Letters Patent is:

1. A water-soluble thermosettable resinous composition consisting essentially of the heat reaction product of (1) one mole of dicyandiamide, (2) from about 2 moles to about 5.25 moles of formaldehyde, (3) an acid salt of a water-soluble aminopolyamide in an amount to provide from about .125 to .5 equivalent of basic nitrogen, and (4) an ammonium salt in an amount to provide a total of from about 0.8 equivalent to about 1.2 equivalents of basic nitrogen, a 50–60% solids aqueous solution of the resinous composition having a viscosity of from about G–X on the Gardner-Holdt scale.

2. The water-soluble thermosettable resinous composition of claim 1 in which the viscosity is S–X.

3. The resinous composition of claim 2 wherein (3) is selected from the sulfuric acid salt or hydrochloric acid salt of a water-soluble aminopolyamide derived from adipic acid and diethylenetriamine.

4. The resinous composition of claim 2 wherein (3) is selected from the sulfuric acid salt or hydrochloric acid salt of a water-soluble aminopolyamide derived from adipic acid and diethylenetriamine and ethylenediamine.

5. The resinous composition of claim 3 wherein the ammonium salt is selected from the group consisting of ammonium sulfate and ammonium chloride.

6. The resinous composition of claim 4 wherein the ammonium salt is selected from the group consisting of ammonium sulfate and ammonium chloride.

7. The method of preparing an aqueous solution of a potentially thermosettable water-soluble resinous composition which comprises preparing an admixture, in an aqueous medium consisting essentially of, (1) about one mole of dicyandiamide, (2) about 2 moles to about 5.25 moles of formaldehyde, (3) an acid salt of a water-soluble aminopolyamide in an amount to provide from about .125 to about .5 equivalent of basic nitrogen, and (4) an ammonium salt in an amount such that there will be a total of from 0.8 equivalent to 1.2 equivalents of basic nitrogen present in the aqueous medium, heating the admixture at reflux temperature for a period of time such that a 50%–60% aqueous solids solution of the resinous reaction product has a viscosity of from G–X on the Gardner-Holdt scale.

8. The method of claim 7 wherein the heating step is carried out for a period such that a 50%–60% aqueous solids solution of the resinous reaction product has a viscosity of S–X on the Gardner-Holdt scale.

9. A method of preparing a water-soluble thermosettable resinous composition which comprises providing, in aqueous medium, a mixture consisting essentially of about one mole of dicyandiamide, from about .75 mole to 1.5 moles of formaldehyde, an acid salt of an aminopolyamide in an amount sufficient to provide from about .125 to about .5 equivalent of basic nitrogen, heating the aqueous mixture to reflux and refluxing the aqueous mixture for a period of time from about 15 minutes to about 30 minutes, adding to the refluxed aqueous mixture an ammonium salt in an amont such that there will be from about 0.8 equivalent to about 1.2 equivalents of basic nitrogen in the aqueous medium, refluxing the resulting aqueous medium until substantially all nitriles of the dicyandiamide have reacted, adding to the reaction mass from about 1.25 to about 3.75 moles of formaldehyde, and heating the resulting mixture at reflux for a period of time such that the viscosity of an aqueous solution of the resulting reaction product, having a solids content of from about 50% to about 60%, is from about G–X on the Gardner-Holdt scale.

10. The method of claim 9 wherein reaction is carried out to a point where the 50%–60% aqueous solution of reaction product has a viscosity of from about S to X on the Gardner-Holdt scale.

11. The method of claim 10 wherein the aminopolyamide salt is selected from the sulfuric acid salt or the hydrochloric acid salt of a water-soluble aminopolyamide derived from adipic acid and diethylenetriamine.

12. The method of claim 10 wherein the aminopolyamide salt is selected from the sulfuric acid salt or the hydrochloric acid salt of a water-soluble aminopolyamide derived from adipic acid, diethylenetriamine, and ethylenediamne.

13. The method of claim 11 wherein the ammonium salt is slected from the group consisting of ammonium sulfate and ammonium chloride.

14. The method of claim 12 wherein the ammonium salt is selected from the group consisting of ammonium sulfate and ammonium chloride.

References Cited
UNITED STATES PATENTS

| | | | |
|---|---|---|---|
| 2,768,055 | 10/1956 | Streck et al. | 260—69 N X |
| 2,774,749 | 12/1956 | Stanley et al. | 260—69 N |
| 2,926,154 | 2/1960 | Keim | 260—9 X |
| 2,950,268 | 8/1960 | Cofrancesco et al. | 260—69 |
| 3,372,131 | 3/1968 | Rohlfs et al. | 260—69 N UX |
| 3,639,646 | 2/1972 | Borchert et al. | 260—69 N |
| 2,741,535 | 4/1956 | Streck | 260—69 N X |
| 3,420,735 | 1/1969 | Conte et al. | 260—72 R X |
| 3,607,622 | 9/1971 | Espy | 260—72 R X |

HOWARD E. SCHAIN, Primary Examiner

U.S. Cl. X.R.

162—166, 167; 260—69 N, 72 N